(12) United States Patent
Klingel

(10) Patent No.: US 7,302,800 B2
(45) Date of Patent: Dec. 4, 2007

(54) TURBOCHARGER FOR AN INTERNAL COMBUSTION ENGINE

(75) Inventor: Dieter Klingel, Kirchheim (DE)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 11/470,147

(22) Filed: Sep. 5, 2006

(65) Prior Publication Data
US 2007/0056283 A1    Mar. 15, 2007

(51) Int. Cl.
F02B 37/00    (2006.01)
F02B 37/013    (2006.01)
F02C 6/12    (2006.01)

(52) U.S. Cl. .................... 60/612; 417/406; 417/409

(58) Field of Classification Search ............... 60/612, 60/605.1; 417/406, 409; F02B 37/00, 37/013; F02C 6/12
See application file for complete search history.

(56) References Cited

U.S. PATENT DOCUMENTS 3,930,747 A * 1/1976 Woollenweber ............ 60/605.1
4,032,262 A * 6/1977 Zehnder ..................... 60/612
4,482,303 A * 11/1984 Acosta ........................ 417/406
4,930,315 A * 6/1990 Kanesaka ..................... 60/612
5,560,207 A * 10/1996 Ramsden et al. ........... 60/605.1
5,692,378 A * 12/1997 Ramsden ..................... 60/612
6,418,723 B1   7/2002 Gladden ....................... 60/612
6,802,184 B2 * 10/2004 Huter et al. ................. 60/612
2006/0254273 A1* 11/2006 Grissom et al. .............. 60/602

FOREIGN PATENT DOCUMENTS

DE    3142499 A   *  5/1983
DE    19822874 A1 * 11/1999
DE    19837978      11/1999
JP    07031122 A  * 11/1995
JP    2005120937 A *  5/2005
JP    2005133651 A *  5/2005

* cited by examiner

Primary Examiner—Thai-Ba Trieu
(74) Attorney, Agent, or Firm—Stephan A. Pendorf; Akerman Senterfitt

(57) ABSTRACT

The invention concerns a turbocharger for an internal combustion engine, which is at least two-stage, wherein each respective stage of the turbocharger system is respectively a turbine and respectively a compressor, which via a common shaft are coupled with each other, wherein at least the exhaust gas side parts of the exhaust gas turbocharger are integrated in a common housing unit. The invention further concerns an internal combustion engine with such a compressor system.

15 Claims, 6 Drawing Sheets

TURBOCHARGER FOR AN INTERNAL COMBUSTION ENGINE

BACKGROUND OF THE INVENTION

1. Field of the Invention

The invention concerns a compressor system for an internal combustion engine of the type described in the precharacterizing portion of claim 1, that is, a turbocharger system having at least two stages, wherein each of the stages of the compressor system respectively includes a turbine and a compressor, which are coupled to each other via a common shaft. The invention further concerns an internal combustion engine with a compressor system.

2. Description of the Related Art

One example of such compressor system is an exhaust gas driven turbocharger. Modern turbocharged internal combustion engines are equipped with a two-stage turbocharger. A two-stage turbocharger includes a low-pressure stage as well as a high-pressure stage, which respectively include a compressor and a turbine. Turbine and compressor are connected to each via a common shaft. A generic internal combustion engine with such a two-stage compressor system is described for example in German OS DE 198 37 978 A1 and DE 195 14 572 A1 in such detail that their construction and manner of operation need not be described herein in greater detail.

A problem with a two or more stage turbocharger is the space necessary therefore, in view of the limited space available in the engine compartment. This problem is particularly serious in commercial vehicles, in which the individual turbocharger stages must naturally be dimensioned much larger than in the case of personal vehicles and therewith require a substantial amount of space in the engine compartment. This is however often not available, so that the space requirement for a two-stage turbocharger often leads to insolvable problems.

An arrangement is described in German patent application DE 198 22 874 A1 in which two exhaust gas turbochargers are integrated in a common housing. The arrangement described in DE 198 22 874 A1 however concerns a manner of integration of two turbochargers arranged in parallel on the exhaust gas side, each of which respectively exhibiting a single turbocharger stage. The two parallel turbochargers exhibit a common inlet and two separate exhaust gas outlets. The particular advantage of the arrangement described in DE 198 22 874 A1 is comprised therein, that the otherwise conventional separate manifold can be dispensed with.

The integration to two turbochargers into a single housing described in German OS DE 198 22 874 A1 could however not be adapted easily to a two-stage turbocharger. The reason therefore is that a parallel arrangement of turbochargers exhibits basically a different construction of the housing than in the case of a series arrangement. In particular, one could point out that in a parallel arrangement in simple manner by the simple combining of the inlets and/or outlets (as in DE 198 22 874 A1) a space saving can be achieved by saving piping. This measure can however not easily be applied to a sequential design of a turbocharger (two-stage turbocharger), since here different requirements and peripheral conditions exist. For example, care must be taken in a two-stage turbocharger that the hot exhaust gas flow during passage through from the high pressure stage to the low pressure stage occurs without all too great a drop in the exhaust gas temperature or, as the case may be, the flow velocity. In addition a direction of flow must be maintained, that means, that the exhaust gas spiral must exhibit a prescribed predetermined shape.

For this reason, at this time no commercially available two-stage turbochargers are known, in which the two turbocharger stages are integrated into a single common housing.

SUMMARY OF THE INVENTION

The present invention is thus concerned with the task of providing a space saving two-stage exhaust gas turbocharger.

In accordance with the invention this task is solved by a turbocharger system with the characterizing features of patent claim 1. In accordance therewith a conventional compressor system is provided, in which however at least the exhaust gas side part of the exhaust gas turbocharger is integrated into a common housing unit or in two housing units, which are connected with each other by suitable constructive means in space saving manner.

The invention further concerns an internal combustion engine with a motor block which includes at least one cylinder and which includes at least one charge air inlet and at least one exhaust gas outlet, with an at least two-stage compressor system.

The particular advantage of the inventive turbocharger arrangement is comprised in its compact constructive design. In the individual stages of the turbocharger, or as the case may be, at least the turbines, allow themselves thereby to be connected with each other without connective piping. The thereby dispensed piping between the two turbocharger stages provides a substantial cost saving. Beyond this, on the basis of the compact design of the exhaust gas turbocharger a simplified mounting and installation is possible, which leads to a further cost saving. The compact design of the exhaust gas turbocharger finally has a particular advantage, that the space requirement in the engine compartment is much smaller. In this manner the vehicle manufacturer gains a substantial degree of freedom, since the two-stage turbochargers designed to be smaller in accordance with the invention are much easier to integrate into the engine compartment.

Advantageous embodiments and further developments of the invention can be found in the dependent claims as well as the description associated with the figures.

BRIEF DESCRIPTION OF THE DRAWINGS

The invention will in the following be described in greater detail on the basis of the illustrative embodiments shown in the figures. There is shown.

DETAILED DESCRIPTION OF THE INVENTION

In all the figures of the drawings the same parts or as the case may be functional equivalent elements—unless indicated otherwise—are provided with the same reference numbers. In the figures additionally the direction of the exhaust gas flow as well as the charge airflow is shown respectively by arrows in the appropriate piping.

Figure 1:
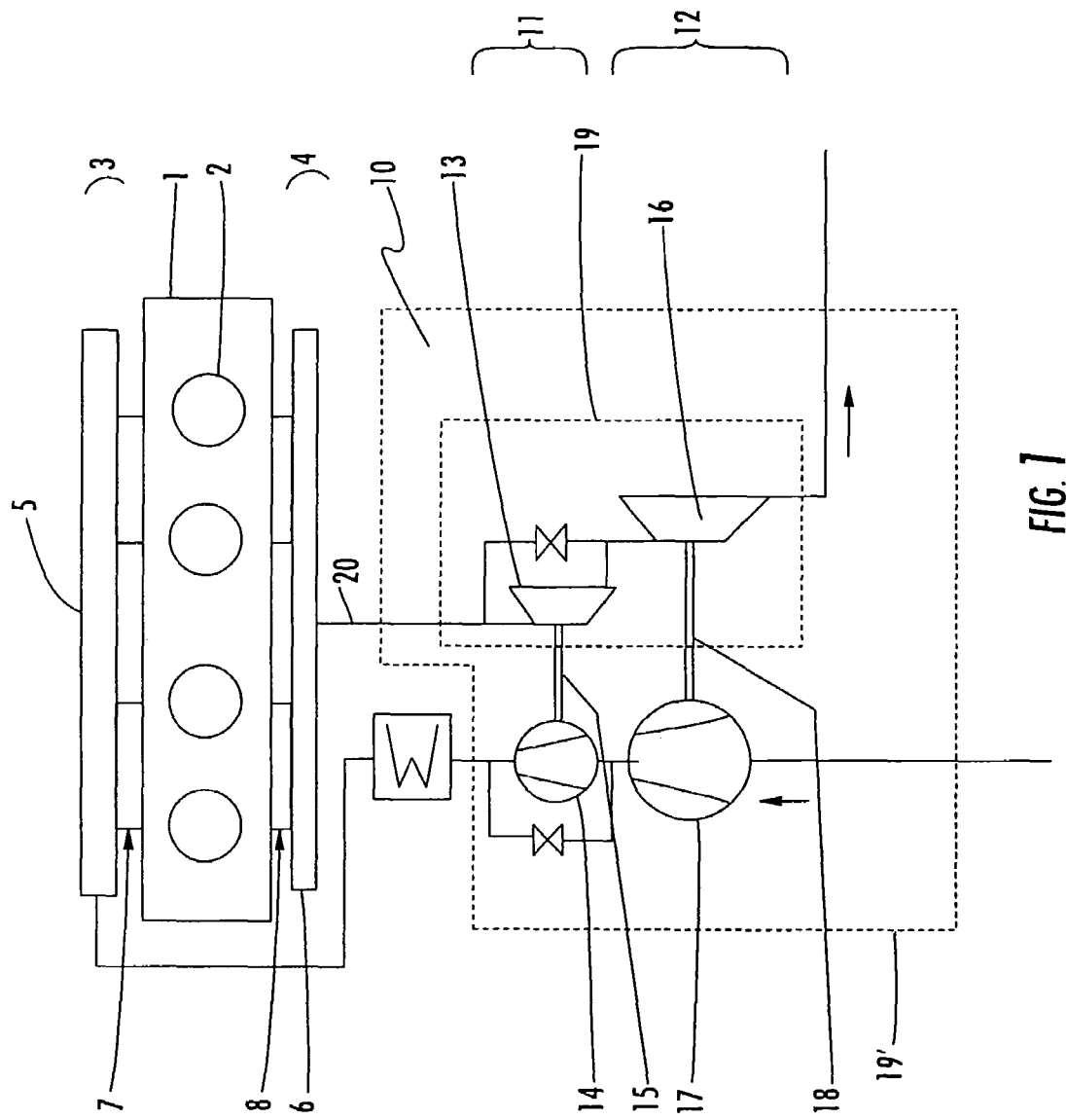
FIG. 1 in a schematic representation an internal combustion engine with an inventive two-stage compressor.

FIG. 1 shows in a schematic representation an internal combustion engine with an inventive two-stage compressor.

In FIG. 1 a four cylinder internal combustion engine is indicated with reference number 1. The cylinders 2 of the internal combustion engine are shown here arranged in a row. The internal combustion engine 1 includes a charge air side 3 and an exhaust gas side 4, wherein the inlets 7 at the charge air side 3 are connected with the charge air collection pipe 5 and the outlets 8 of the internal combustion engine 1 are connected with the exhaust gas side 4 with the exhaust gas manifold 6.

In FIG. 1 there is further shown with reference number 10 the inventive, two-stage exhaust gas turbocharger 10. Such a two-stage turbocharger 10 includes a high-pressure stage 11 and a low-pressure stage 12. The high-pressure stage 11 is comprised of a high-pressure turbine 13 and a high-pressure compressor 14, which are rigidly connected with each other via a common shaft 15. In the same manner the low-pressure stage 12 includes a low-pressure turbine 16 and a low-pressure compressor 17 connected to each other via a common shaft 18. The high-pressure stage 11 is provided upstream of the low-pressure stage with reference to the direction of flow of the exhaust gas.

In accordance with the invention the turbine housing of the high-pressure turbine 13 and low-pressure turbine 16 are integrated into a common turbine housing unit 19 and therewith arranged in very compact and space saving mode and manner to each other. In FIG. 1 this arrangement is indicated with the dotted lines, which is intended to represent the housing 19. In addition, or alternatively thereto, the two-stages 11, 12 of the exhaust turbocharger 10 can be integrated into a common housing 19'. This is indicated in FIG. 1 by the dashed lines. The two turbine housings can also be integrated into two housing units, which are connected to each by suitable constructive means in space saving manner.

The two-stage compressor system designed in accordance with the invention makes possible, by the type of the constructive design of the turbine, an optimal control of the exhaust gas for recirculation and an increase in the motor brake capacity over the entire motor operating range.

The invention is described in greater detail in the following on the basis of the construction designs of FIGS. 2a through 2d.

Figure 2A:
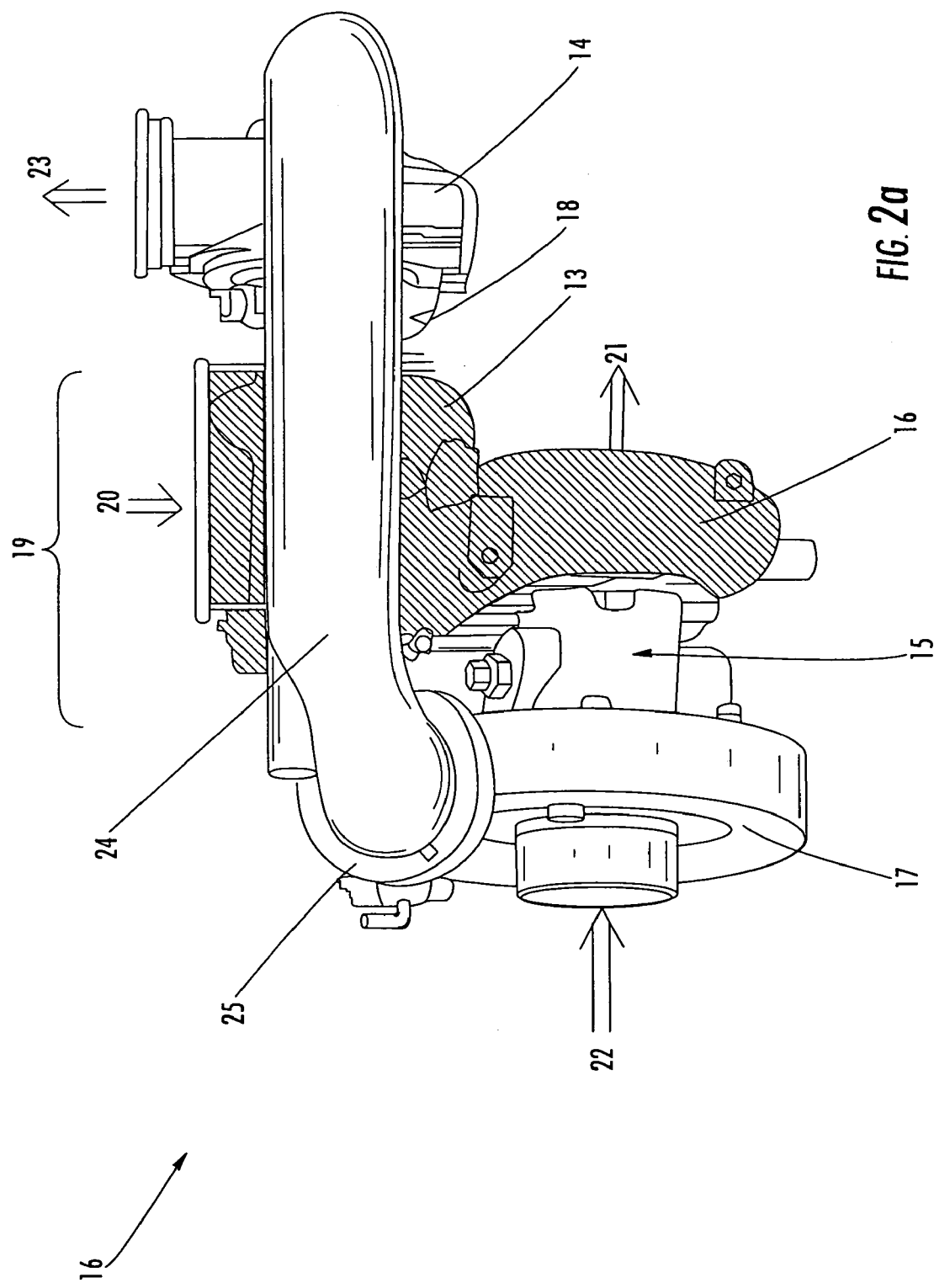
FIG. 2 a representation (a)-(d) of the assembled housing of an inventive two-stage turbocharger, in which the housing is shown from various sides.
Figure 2C:
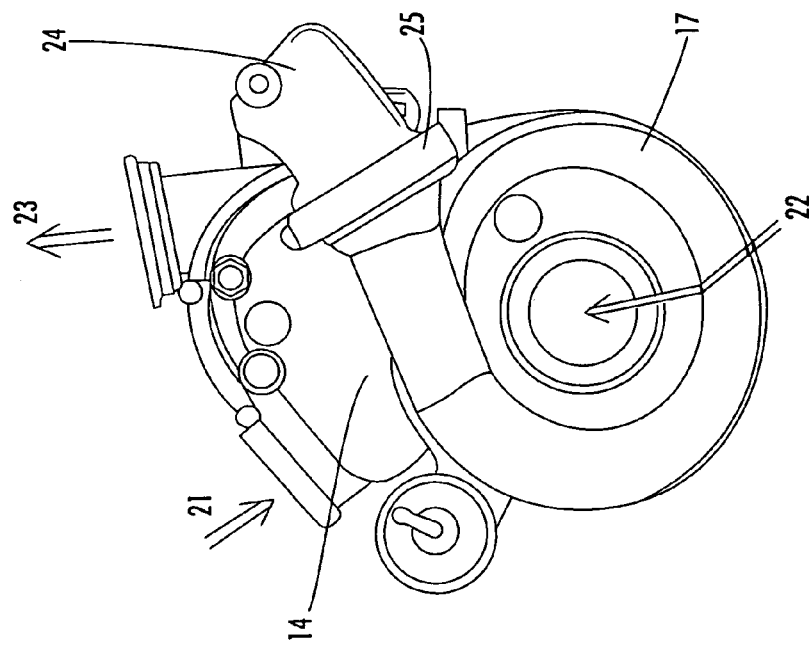
Figure 2B:
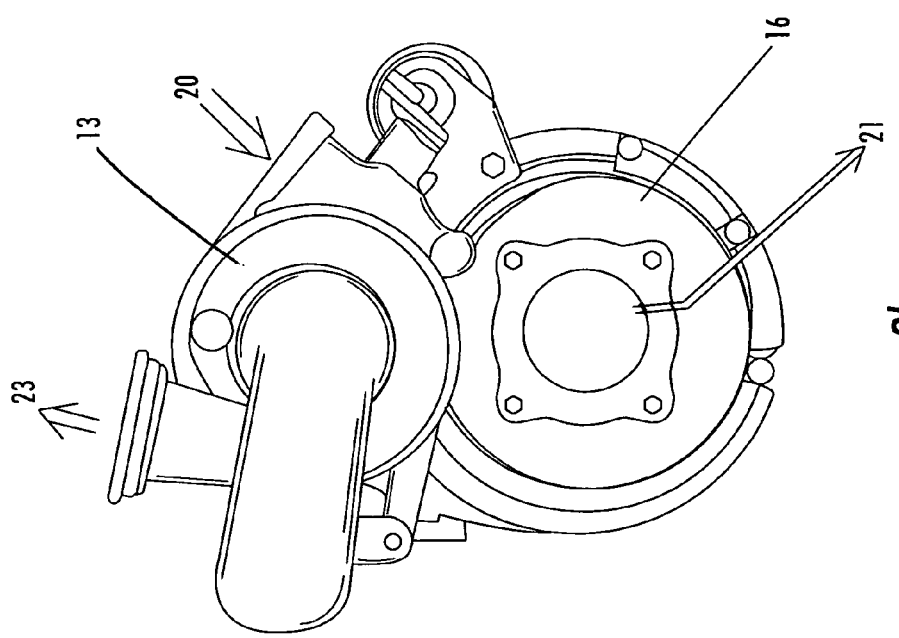
Figure 2D:
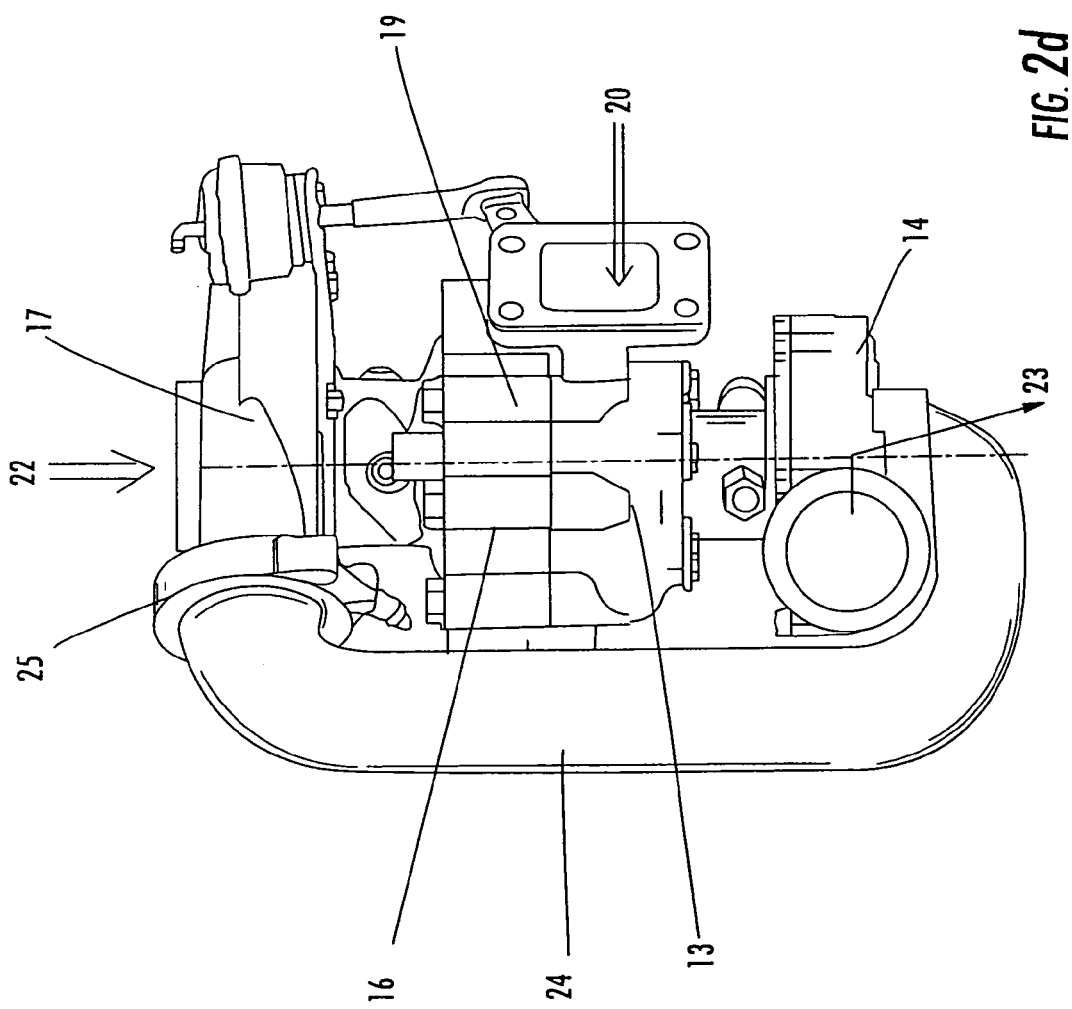

FIG. 2a shows the common turbine housing 19 of the high-pressure turbine 13 and the low-pressure turbine 16. The common housing 19 includes an exhaust gas inlet 20 as well as an exhaust gas outlet 21. The exhaust gas inlet 20 is adapted to be coupled to a not shown exhaust gas manifold, via which the high-pressure turbine 13 is connectable to the upstream exhaust gas with the exhaust gas manifold 6 of the internal combustion engine 1. The exhaust gas outlet 21 is likewise connectable with an exhaust gas piping, which is connected to an exhaust pipe after flowing through the two turbines 13, 16. The particular advantage is comprised herein, that the exhaust gas outlet of the high-pressure turbine 13 is connected directly with the exhaust gas inlet of the low-pressure turbine 16, that therewith the necessity of a more or less longer piping can be dispensed with, since their function is satisfied by the design of the common turbine housing 19. The two turbines 13, 16 are thus provided with common ducting as shown in FIG. 2 or in similar manner.

The low-pressure compressor 17 includes a charge air inlet 22. Via piping not shown in FIG. 2, which can be coupled or flange connected to the charge air inlet 22, fresh air can be supplied to the low-pressure stage 12 of the exhaust gas turbocharger 10. The high-pressure compressor 14 includes a charge air outlet 23. Piping can be coupled or flanged (flange 25) to the fresh air outlet 23 via which fresh air, which after being acted upon by the high-pressure compressor 14, is supplied to the charge air inlet 7 of the internal combustion engine 1.

The low-pressure compressor 17 is connected with the high-pressure compressor 14 via a piping 24, which is connectable by flange between the outlet of the low-pressure compressor 17 and the inlet of the high-pressure compressor 14.

The compact arrangement of the cumulative or common turbine housing 19 has above all the advantage, that the two-stage turbocharger 10 is therewith designed in space saving manner. The compact arrangement of the two turbines 13, 16 in a common housing 19 has the further technical advantage, that the exhaust gas, which flows from the high-pressure turbine 13 to the low-pressure turbine 16, essentially has a very small path or distance to travel. The loss of kinetic energy, which the exhaust gas experiences in the channel between high-pressure turbine 13 and low-pressure turbine 16, is thus minimal. Beyond this, the temperature drop determined by the short path distance and by the closely located turbines 13, 16 is likewise minimal. The minimization of the thermal and kinetic loss imparts a higher velocity of the turbine wheels. As a result thereof the compressor wheels also have a high rotational velocity, which more strongly compresses the charge air and therewith increases the engine capacity.

Figure 3:
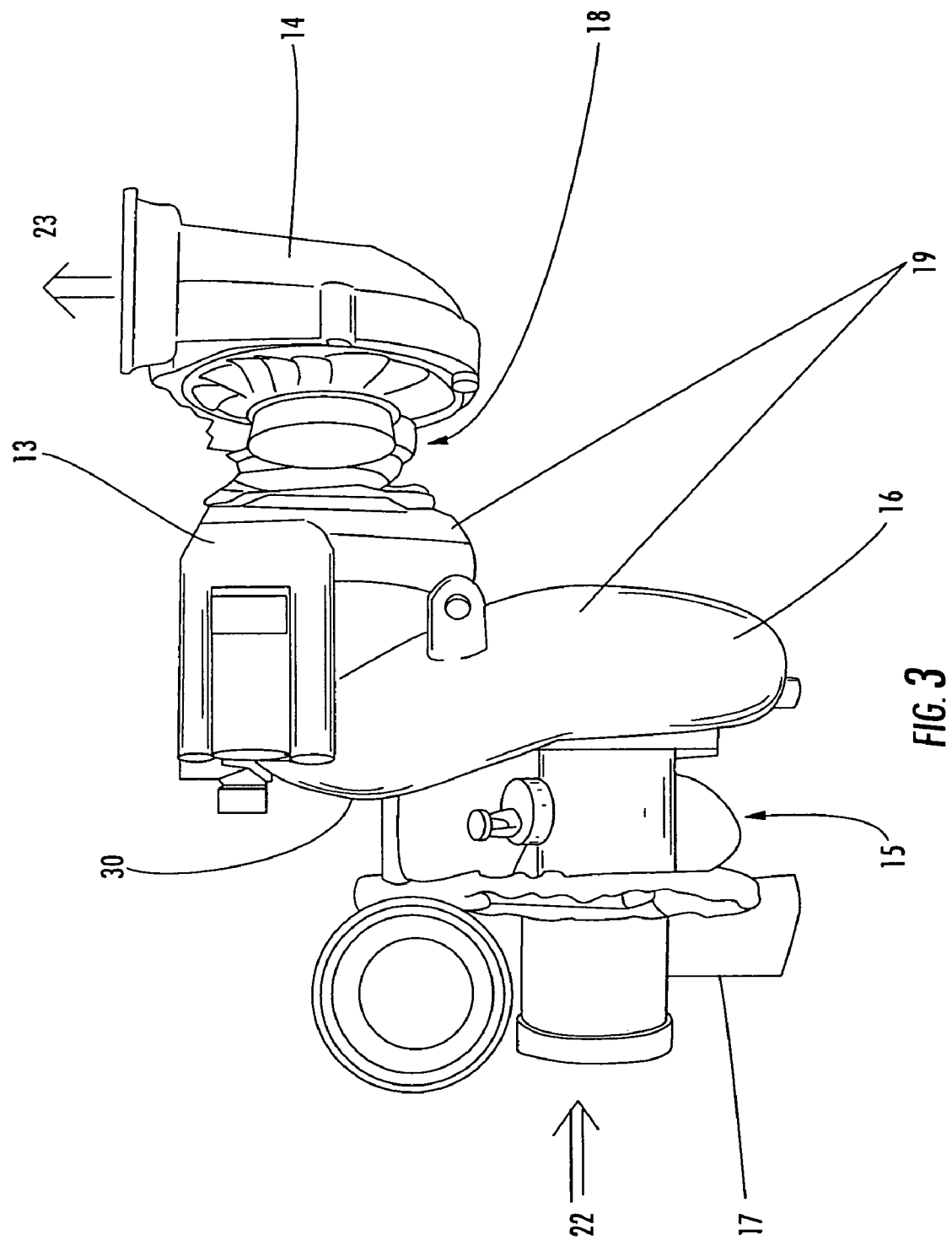
FIG. 3 a respective representation of the exhaust gas turbocharger according to FIG. 2 with not yet coupled or, as the case may be, flange fit, connecting piping between the compressors, and FIG. 4 a conventional turbocharger with twin channel (twin volute) turbine housing.

Of course, the direction of charge air and exhaust gas flow shown in FIGS. 2 and 3 could just as easily be in the reverse direction, with exhaust gas flowing through what becomes inlet 21 and outlet 20, and charge air flowing though what becomes inlet 23 and outlet 22, such that low pressure and high pressure stage are likewise reversed. The external features of the turbocharger remain unchanged.

FIG. 3 shows a pictorial representation of the exhaust gas turbocharger according to FIG. 2 with not yet connected or as the case may flanged connecting piping between the compressors. In FIG. 3 it is particularly easy to recognize, how the two turbines 13, 16 are arranged in a common housing 19. In particular the two turbines 13, 16 are ducted in a certain manner to each other, so that thereby a compact and space saving arrangement of these turbine housings is ensured to the greatest extent possible. As can likewise be seen from FIG. 3, the common turbine housing 19 is preferably made of cast iron, wherein by known manufacturing processes the respective turbine blades can be introduced into the housing 19. Shown particularly also in FIG. 3 is that the connecting channel between the high-pressure turbine 13 and the low-pressure turbine 16 is extraordinarily short and essentially determined by the respective turbine geometries of the high-pressure turbine and low-pressure turbine. In the present illustrative embodiment the high-pressure turbine 13 exhibits a smaller wheel diameter than the low-pressure turbine 16, whereby the wheel diameter relationship between low-pressure and high-pressure turbines typically, however not necessarily, is in the range of 1.2 to 1.8. In similar manner the compressor wheel of the high-pressure compressor 14 exhibits a smaller diameter than the compressor wheel of the low-pressure compressor 17.

Figure 4:
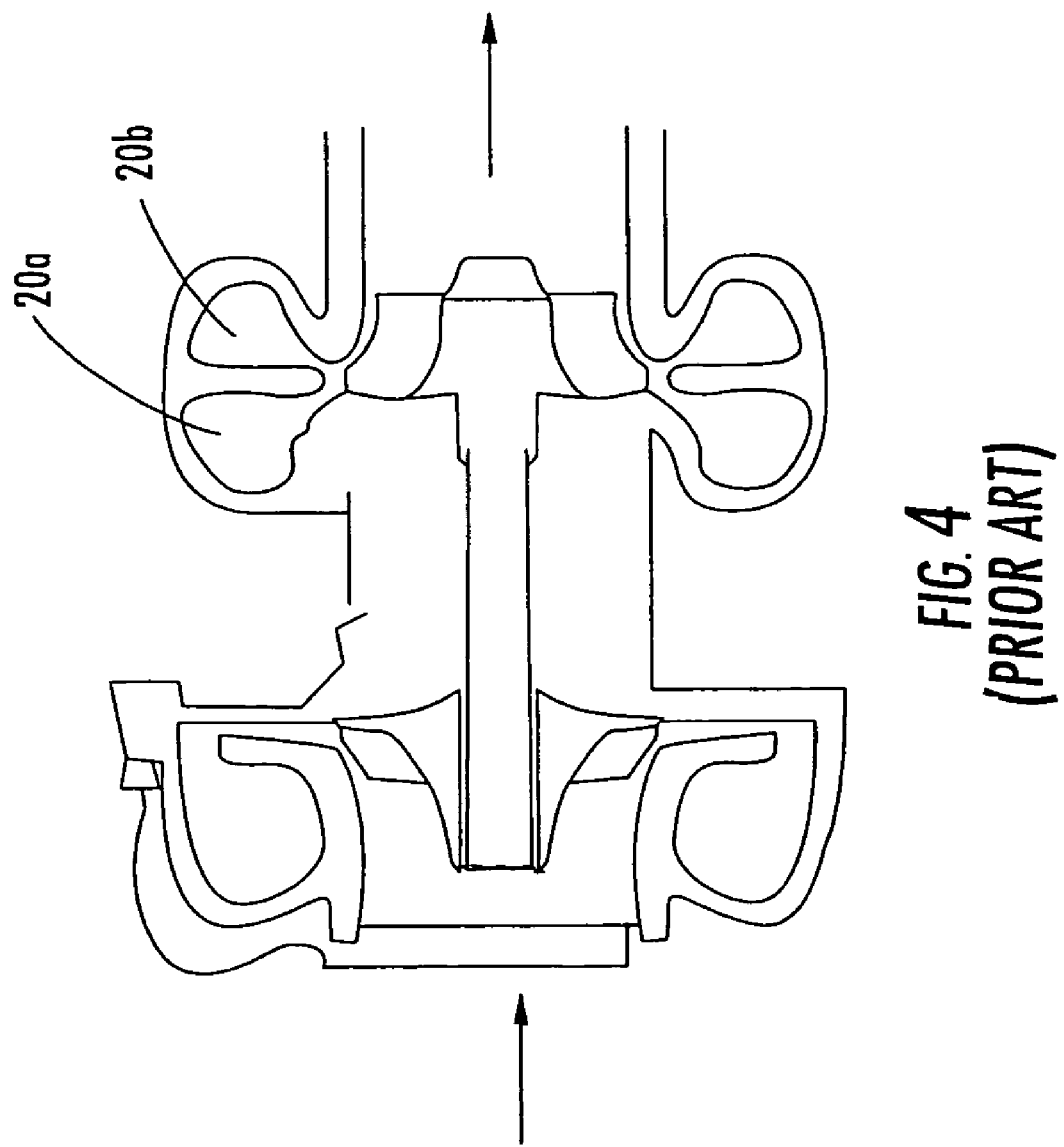

The high-pressure stage can be one channel or, as shown in FIG. 4, two channel (volute), with first channel 20a and second channel 20b. In the case of a one channel high-pressure stage the turbine housing typically includes basically one bypass opening, which in certain cases can also be enlarged. In the case of a two or more channel high-pressure stages the turbine housing typically exhibits two, in certain cases likewise enlarged, bypass boreholes. Advantageously the exit channel is produced by milling of a surface, which at the same time represents the seat of a flapper plate and the sealing surface of the flanging of the low-pressure stage. This variant can be represented by a use of two separate control flaps and possibly dissimilar or different sized spiral cross-section segments of the two turbine channels by means of a control derived from the exhaust gas pressure from the turbine. This makes possible not only a differentiated distribution of the exhaust gas mass flow to high-pressure and low-pressure stage, but rather also a control of the exhaust gas recirculation rate in the case that the motor is provided with a exhaust gas recirculation.

In cooperation with a controlled exhaust gas braking flap an elevation of the exhaust gas break capacity be achieved over the entire motor operating range there can by control of the bypass flap.

The turbine housing of the low-pressure stage is typically designed with one channel, although under circumstances also a two channel arranged turbine housing of the low-pressure stage is conceivable. In any case, in one embodiment of the turbine unit the low-pressure stage can be designed in elongated shape, so that the flange on the exhaust gas inlet is directly flange-connected to the outlet of the high-pressure stage. The turbine inlet covers over therewith the turbine outlet and the bypass or bore hole of the high-pressure stage. In the elongated neck of the turbine housing of the low-pressure stage there can then advantageously also be provided a mounting and a flap(s) for control of the bypass mass flow.

This inventive very compact construction of a two-stage controlled compressor makes possible on the one hand an extremely compact construction of the turbine housing, which reduces the number of the sealing surfaces, which provides a possibility of the control of a possibly present exhaust gas recirculation rate and which makes possible an increase in the braking power.

The invention is of course not exclusively limited to the two-stage design of the turbocharger, but rather can also be applied to three or more stage turbochargers.

In the present embodiment essentially a common turbine housing for high and low-pressure turbine was shown. Of course it would also be possible, in addition or alternatively, to arrange the two compressors in a common single housing. However, this compact arrangement is not particularly necessary. Although such a compact design would save space, the above-described technical advantages with respect to an increase in the motor output by a reduction in the kinetic and thermal losses would not automatically necessarily also result thereby.

In conclusion it can be stated that, by the compact design of the turbine housing or as the case may be the turbocharger housing, a simple however nevertheless very effective manner a space saving arrangement for a two-stage turbocharger has been provided, which beyond this provides an improved power characteristic and beyond this an improved motor brake characteristic than known turbochargers, without requiring a constructionally complex and very expensive solution according to the state of the art.

The present invention has been disclosed for explanatory purposes on the basis of the described embodiment, such that the principle of the invention and its practical application has been demonstrated as well as possible; however, it will be readily apparent that the invention can of course be modified into multiple other embodiments.

REFERENCE NUMBER LIST 1 internal combustion engine
2 cylinder
3 charge air side
4 exhaust gas side
5 charge air collection inlet
6 exhaust gas manifold
7 inlet
8 outlet
10 turbocharger
11 high-pressure stage
12 low-pressure stage
13 (high-pressure) turbine
14 (high-pressure) compressor
15, 18 shaft
16 low-pressure turbine
17 low-pressure compressor
18 shaft
19 common turbine housing
19' housing of the exhaust gas turbocharger
20 exhaust gas inlet
21 exhaust gas outlet
22 compressed air inlet
23 compressed air outlet
24 connecting pipe
25 flange

The invention claimed is:

1. A turbocharger for an internal combustion engine, which is at least two-staged, wherein each respective stage (11, 12) comprises one turbine (13, 16) and respectively one compressor (14, 17), which are connected with each other via a common shaft (15, 18), wherein each of the turbines (13, 16) of the exhaust gas turbocharger (10) are integrated into a common housing unit (19, 19'), wherein an exhaust outlet of the high-pressure turbine (13) is directly connected with an inlet of the low-pressure turbine (16), wherein each of said turbines receives exhaust gas radially and discharges exhaust gas axially based on the respective axis of rotation of said turbines.

2. A turbocharger according to claim 1, wherein at least one high-pressure stage (11) and at least one low-pressure stage (12) are provided, wherein the low-pressure stage (12) is provided downstream and the high-pressure stage (11) is provided upstream with respect to the direction of flow of the exhaust gas.

3. A turbocharger according to claim 2, wherein the high pressure stage (11) includes at least one high-pressure turbine (13) in the flow of the exhaust gas and at least one high-pressure compressor (14) in the flow of the charge air, which are connected to each other via a first common shaft (15) provided between these two, and that the low pressure stage (12) includes at least one low-pressure turbine (16) in the flow of the exhaust gas and at least one low-pressure compressor (17) provided in the flow of the charge air, which are coupled to each other via a second common shaft (18) provided between them.

4. A turbocharger according to claim 1, wherein an exhaust outlet of the high-pressure turbine (13) is connected with an inlet of the low-pressure turbine (16) via a common channel within the common housing (19) without interposition of piping.

5. A turbocharger according to claim 1, wherein the high pressure stage (11) and the low-pressure stage (12) are integrated in a common housing (19').

6. A turbocharger according to claim 1, wherein at least one turbine (13, 16) of the turbocharger (10) is single volute.

7. A turbocharger according to claim 1, wherein at least one turbine (13, 16) is two or more volute.

8. A turbocharger according to claim 1, wherein the common housing (19, 19') is cast iron.

9. A turbocharger according to claim 1, wherein a pipe connecting line (24) is provided, via which the charge air outlet of the low-pressure compressor (17) is connected with the charge air inlet of the high-pressure compressor (14), preferably via a flange.

10. A turbocharger according to claim 1, wherein the diameter of the turbine wheel of the high-pressure turbine (13) is smaller than the diameter of the turbine wheel of the low-pressure turbine (16).

11. A turbocharger according to claim 1, wherein the common housing (19,19') is comprised of at least first and second pans, wherein the first part houses the first turbine (13) and the second part houses the second turbine (16).

12. A turbocharger according to claim 11, wherein the connection between the first part and the second part of the two turbines (13, 16) is via a flange.

13. A turbocharger according to claim 12, wherein the connection is comprised of an elongated neck of the common housing unit (19, 19').

14. A turbocharger according to claim 13, wherein in the common housing unit (19, 19') at least one flap valve and/or slide valve is provided for controlling a bypass mass flow of the exhaust gas.

15. A turbocharger according to claim 1, wherein the two turbines (13, 16) are provided connected to each other in compact manner.

* * * * *